US008342683B2

(12) United States Patent
Payor et al.

(10) Patent No.: US 8,342,683 B2
(45) Date of Patent: Jan. 1, 2013

(54) OPTIMIZING OPTICAL ABERRATIONS IN OPHTHALMIC LENSES

(75) Inventors: Rick Edward Payor, Cumming, GA (US); Peter Kollbaum, Bloomington, IN (US); Ming Ye, Fort Worth, TX (US); Arthur Bradley, Bloomington, IN (US)

(73) Assignees: Novartis AG, Basel (CH); Indiana University Research and Technology Corporation, Indianapolis, IN (US)

( * ) Notice: Subject to any disclaimer, the term of this patent is extended or adjusted under 35 U.S.C. 154(b) by 91 days.

(21) Appl. No.: 12/868,766

(22) Filed: Aug. 26, 2010

(65) Prior Publication Data

US 2011/0102737 A1    May 5, 2011

Related U.S. Application Data

(60) Provisional application No. 61/237,514, filed on Aug. 27, 2009.

(51) Int. Cl.
*G02C 7/04* (2006.01)
(52) U.S. Cl. .......... 351/159.74; 351/159.02; 351/159.77
(58) Field of Classification Search ... 351/160 R–160 H, 351/177, 159.02–159.38, 159.73, 159.77, 351/159.74
See application file for complete search history.

(56) References Cited

U.S. PATENT DOCUMENTS

| | | | |
|---|---|---|---|
| 4,195,919 A | 4/1980 | Shelton | |
| 5,771,088 A | 6/1998 | Perrott | |
| 5,815,239 A | 9/1998 | Chapman | |
| 6,082,856 A | 7/2000 | Dunn | |
| 6,244,708 B1 | 6/2001 | Chapman | |
| 6,536,899 B1 * | 3/2003 | Fiala | .............. 351/168 |
| 6,585,375 B2 | 7/2003 | Donitzky | |
| 6,609,793 B2 | 8/2003 | Norrby | |
| 6,726,323 B2 | 4/2004 | Miyamura | |
| 6,802,605 B2 | 10/2004 | Cox | |
| RE38,839 E | 10/2005 | Magnante | |
| 7,147,325 B2 | 12/2006 | Gotou | |

(Continued)

FOREIGN PATENT DOCUMENTS

WO    0028368 A1    5/2000

OTHER PUBLICATIONS

PCT International Search Report dated Oct. 19, 2010, International Application No. PCT/US2010/046719, International Filing Date Aug. 26, 2010.

(Continued)

*Primary Examiner* — Darryl J Collins
(74) *Attorney, Agent, or Firm* — Robert Ambrose

(57) ABSTRACT

An ophthalmic lens includes spherical aberration in an amount that accounts for spherical aberration introduced into the lens during the manufacturing process and/or spherical aberration differences in the manufactured lens measured off of the eye and measured on the eye. The result is a lens-and-eye optical system is free or substantially free of spherical aberration, i.e., having only negligible spherical aberration. Because the optical system is free or substantially free of spherical aberration, there is no or only negligible coma induced by the normal misalignment of the lens optical axis and the eye's primary line of sight. The result is a lens-and-eye optical system that provides enhanced optical performance and visual quality. Also disclosed are methods of designing and manufacturing lenses with spherical aberration adjustments to account for manufacturing process changes and off-eye to on-eye differences.

16 Claims, 5 Drawing Sheets

U.S. PATENT DOCUMENTS

| | | |
|---|---|---|
| 7,241,311 B2 | 7/2007 | Norrby |
| 7,261,412 B2 | 8/2007 | Somani |
| 7,350,916 B2 | 4/2008 | Hong |
| 7,380,937 B2 | 6/2008 | Ye |
| 7,490,937 B2 | 2/2009 | Ye |
| 2007/0279585 A1 | 12/2007 | Bartoli |

OTHER PUBLICATIONS

PCT Written Opinion of the International Searching Authority dated Oct. 19, 2010, International Application No. PCT/US2010/046719, International Filing Date Aug. 26, 2010.

* cited by examiner

OPTIMIZING OPTICAL ABERRATIONS IN OPHTHALMIC LENSES

This application claims the benefit under 35 U.S.C. §119 (e) of U.S. provisional application Ser. No. 61/237,514 filed on Aug. 27, 2009, herein incorporated by reference in its entirety.

REFERENCE TO GOVERNMENT RIGHTS

This invention was made with government support under K23 EY016170 awarded by National Institutes of Health. The U.S. Government has certain rights in the invention.

TECHNICAL FIELD

The present invention relates generally to the field of ophthalmic lenses and, more particularly, to optimizing aberrations in corrective refractive surfaces of ophthalmic lenses to provide enhanced vision.

BACKGROUND

Contact lenses are ophthalmic lenses worn on the anterior surface of the cornea and widely used for correcting several different types of vision defects. These defects include near-sightedness (myopia) and far-sightedness (hypermetropia), astigmatism, and deficiencies in near-range vision usually associated with aging (presbyopia). Soft contact lenses include a posterior surface that fits against the cornea and an opposite anterior surface usually having an optical zone, which is smaller than the entire anterior surface and which has a refractive error or optical correction that refracts light to correct the vision defect. Specifically, but not limited to the case of soft toric lenses for the correction of astigmatism, it is common to separate the toric (astigmatic) or cylinder power on the posterior surface of the lens and the sphere power (minus power correcting myopia or positive power correcting hypermetropia) on the anterior surface. In the case of presbyopia, the addition power is commonly on the posterior surface while the sphere power is on the anterior surface. For manufacturability, optical design or clinical reasons it can be beneficial to split the optical correction between these two surfaces.

Traditionally, contact lenses have been designed with posterior and anterior surfaces that are spherical. This has been done because of the ease of manufacturing these relatively simple surfaces, however, the spherical geometry introduces spherical aberration into the lens. Spherical aberration is one of the main higher order aberrations present in spherical contact lenses. While the resulting vision of stock (not customized to the individual's specific aberrations) spherical contact lenses when worn on the eye has been generally acceptable, patients commonly request improvement in their vision that is not currently available with contact lenses.

In an effort to provide improved vision, it has been suggested to design contact lenses with zero spherical aberration. Typically, such lenses would have an asphericity on one or both surfaces for eliminating the spherical aberration. However, it has been found in clinical practice that some aspherical contact lenses reported to be designed with zero spherical aberration do not in fact produce significantly enhanced vision when worn on the eye.

Other efforts to provide enhanced vision have focused on designing contact lenses having an equal but opposite spherical aberration to the population's mean spherical aberration of the eye alone. For example, U.S. Pat. Nos. 6,244,708 and 5,815,239 to Chapman et. al disclose contact lenses with a spherical aberration of −0.2 to −0.6 Diopter designed into the lenses to cancel out the spherical aberration of the average eye. However, it has been found that in practice these lenses do not in fact produce significantly enhanced vision when worn on the eye.

Accordingly, it can be seen that needs exist for improvements in contact lenses to account for spherical aberration in a way that enhances vision. It is to such improvements that the present invention is primarily directed.

SUMMARY

Generally described, in one aspect the present invention provides ophthalmic lenses including a spherical aberration adjustment in an amount that corrects for spherical aberration differences introduced into the lenses. The spherical aberration differences are introduced into the lens by the lens manufacturing process/equipment, by placing the lens on the eye, by both, or by one or both of these in combination with other spherical aberration differences introduced into the lens. The result is a lens that, when worn on the eye (an "on-eye" lens), is substantially free of spherical aberration. Because there is no or negligible spherical aberration, there is no or negligible coma induced by the normal misalignment (i.e., decentering) of the lens's optical axis and the eye's optical axis. The resulting lens-and-eye optical system therefore provides enhanced optical performance and visual quality. In embodiments, the spherical aberration adjustment may range from greater than about −0.06 µm to less than about +0.18 µm for an about 6 mm pupil, or may range from greater than about −0.044 µm to less than about +0.127 µm for an about 6 mm pupil.

In another aspect, the invention provides methods of designing and manufacturing optimized ophthalmic lenses with spherical aberration adjustments to account for spherical aberrations introduced into the lenses. The spherical aberration adjustments and the spherical aberration differences, and the ranges therefor, may be the same as those described above. Thus, the spherical aberration adjustments may be, for example, for manufacturing process changes and off-eye to on-eye differences in the lenses. The method for designing the lens for example can include the steps of designing a base lens; generating data representing a spherical aberration difference introduced when a base lens is placed on and measured on the eye; determining a spherical aberration adjustment based on the spherical aberration difference; and designing the optimized lens to include the spherical aberration adjustment. In In embodiments, the method of designing and manufacturing an optimized ophthalmic lens may include the steps of designing a base lens; manufacturing a base lens according to the base lens design using base lens manufacturing equipment; generating data representing spherical aberration differences in the manufactured base lens from the base lens design, wherein the differences include that introduced by the base lens manufacturing equipment into the base lens and that introduced by lens flexure when the base lens is placed on the eye; selecting a spherical aberration adjustment to be substantially equal and opposite to the spherical aberration difference, wherein the aberration adjustment is selected so that the on-eye lens-and-eye combination is substantially free of spherical aberration when the optimized lens is well-centered on the eye; designing the optimized lens to include the spherical aberration adjustment; and manufacturing the optimized lens according to the optimized lens design using optimized lens manufacturing equipment that is of the same type as the base lens manufacturing equipment.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of exemplary embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Any methods may be performed in sequences other than those listed, unless the context clearly dictates otherwise. Ranges may be expressed herein as from "about" one particular value and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

Unless defined otherwise, all technical and scientific terms used herein have the same meaning as commonly understood by one of ordinary skill in the art to which this invention pertains. Generally, the nomenclature used herein and the manufacturing procedures are well known and commonly employed in the art. Conventional methods are used for these procedures, such as those provided in the art and various general references.

Figure 1:
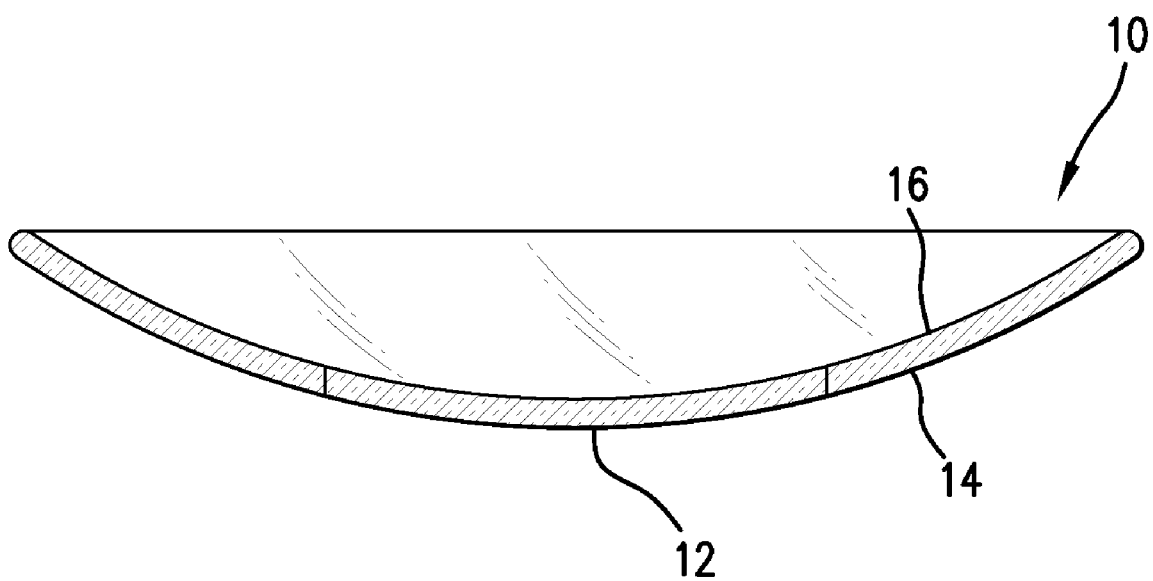
FIG. 1 is a cross-sectional view of a contact lens with optimal optical aberrations according to an example embodiment of the invention.

Generally described, the present invention provides an ophthalmic (e.g., contact) lens, and a method of making the lens, with an aberration that is optimized to produce enhanced vision when worn on the eye. Referring to FIG. 1, there is shown an ophthalmic lens 10 according an example embodiment of the present invention. The lens 10 has at least one refractive surface with at least one optical zone 12 and including at least one optic-power correction and at least one optimized aberration. The optic-power correction is designed to correct for errors in the refractive surfaces of the eye, and thus typically corrects for myopia or hypermetropia, astigmatism, and/or presbyopia. The refractive surface is typically the anterior surface 14 of the lens 10, though in some applications if desired the refractive surface can be the opposite posterior surface 16 or a combination of both the anterior and posterior surfaces. In typical commercial embodiments, the ophthalmic lens is a soft contact lens, though the teachings herein can be applied to other types of ophthalmic lenses such as intraocular lenses (IOLs). In typical commercial embodiments, the ophthalmic lens is made of a conventional material (e.g., silicon hydrogel) using conventional fabrication systems (e.g., ultra-precision single-point diamond turning systems).

Figure 2:
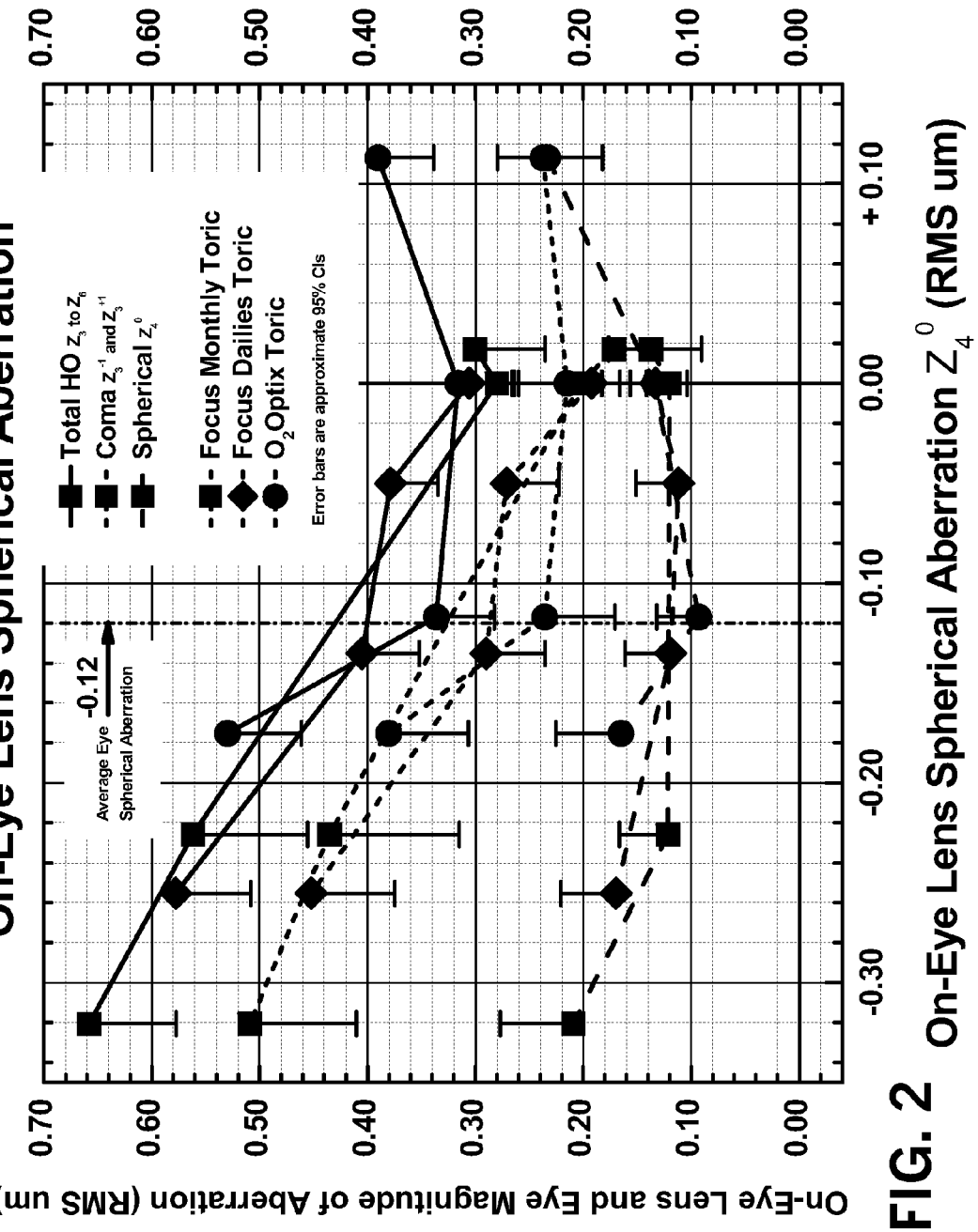
FIG. 2 is a graph of experimentally measured spherical aberration of a series of contact lenses (measured on-eye) plotted against spherical aberration and coma of lens-and-eye optic systems (measured on-eye).

Before describing details of the invention, the research upon which the invention is based first will be detailed. FIG. 2 shows the results of comparison testing of spherical and coma aberrations for CIBA VISION contact lenses of several different stock powers and of three different designs: FOCUS MONTHLY toric lenses, FOCUS DAILIES toric lenses, and $O_2$ OPTIX toric lenses. Each data-point and 95% confidence interval is for the mean of 10-20 lenses on 10-20 eyes for one of the lens designs in one of the stock powers, and each connected set of data-points is for all of the powers tested for that lens design. The figure is a plot of higher order spherical and coma aberrations, specifically, fourth-order spherical aberration (Zernike indice $Z_4^0$), third-order coma aberrations (combined Zernike indices $Z_3^{-1}$ and $Z_3^{+1}$), and the total higher order aberration (Zernike indices $Z_3$ to $Z_6$).

The X-axis (FIG. 2) shows the negative and positive fourth-order spherical aberrations of the lenses "on-eye," that is, the lenses in situ on the eyes of test subjects. The values plotted are the difference between the measured spherical aberration of the eyes and the measured spherical aberration of the lens-and-eye combinations. The Y-axis shows the RMS magnitudes of the combined fourth-order spherical and third-order coma aberrations of the lens-and-eye combinations, that is, the combination of the on-eye lenses and the eyes of the test subjects. The values plotted are the absolute values of the measured negative or positive aberrations of the lens-and-eye combinations. The units for both axes are microns of wavefront deviation. The measurements were taken using a commercially available COMPLETE OPHTHALMIC ANALYSIS SYSTEM (COAS) aberrometer (WAVEFRONT SCIENCES, LLC of Albuquerque, N. Mex.). The measurements were taken with the pupils having greater than a 6 mm diameter and aberration Zernike indices were calculated for exactly a 6 mm diameter.

FIG. 2 is based on the average eye, which has a +0.12 microns mean spherical aberration (U.S. Pat. Nos. 6,244,708 and 5,815,239 to Chapman.) The lowest dataset (group of connected data-points) is the magnitude of spherical aberration of the eyes in combination with the tested lenses. Lenses which do not change the spherical aberration of the eye (the data points of the lowest grouping that are at about zero on the X-axis) are clustered at about +0.12 microns (μm) on the Y-axis. The Y-axis shows the spherical aberration of the lens-and-eye combination; if the on-eye lens does not change the spherical aberration, then the spherical aberration measured is all from the eye.

In addition, the graph shows that the spherical aberrations of the lens-and-eye combinations are minimized for lenses having a spherical aberration of about −0.12 µm. This is shown because the data of the lowest plotted dataset, the spherical aberration for the tested lenses, are linearly decreasing to minimums that are clustered at about −0.12 µm on the X-axis.

All of this makes sense, because if the average eye has a spherical aberration of about +0.12 µm, then a lens with a spherical aberration of about −0.12 µm—an equal and opposite amount—should cancel out that spherical aberration on average. So these findings generally correspond with what would be expected from the teachings of the Chapman reference. In practice, as shown in FIG. 2, the reduction in spherical aberration of a population of eyes wearing a lens designed at −0.12 µm is small at about 0.02 µm. This is because the range of negative and positive spherical aberration in the population is much larger. In practice the −0.12 µm lens increases the spherical aberration of many eyes canceling much of the improvement from the reduction in spherical aberration in the other eyes.

Furthermore, upon further investigation, it was found that including this spherical aberration in the lens design actually increases the total higher order aberration of the lens-and-eye combination. It was found that this is because as the spherical aberration-containing lens decenters on the eye it introduces coma causing a net increase in higher order aberration even if there were a spherical aberration reduction. And coma, along with spherical aberration, has been found to markedly degrade optical and visual performance.

Referring still to FIG. 2, the middle (relative to vertical) plotted dataset is the coma, and the highest plotted dataset is the total for the higher order aberrations. By going from a lens which does not change the spherical aberration of the eye to a lens with a mean change of about −0.12 µm to spherical aberration (going from zero on the X-axis, to the left, to −0.12 µm on the X-axis), the RMS spherical aberration of the lens-and-eye combination (the Y-axis value) is very slightly reduced.

In addition, at the same time that the mean spherical aberration is slightly decreased, the coma aberration of the lens-and-eye combination is significantly increased. This is shown in the graph because by going from zero on the X-axis, to the left, to −0.12 µm on the X-axis, the coma aberration of the lens-and-eye combination (the Y-axis value) is significantly increased from about 0.21 µm to about 0.29 µm. It can be seen that this approach leads to significantly increased coma and a significant net increase in total higher-order aberrations, because the increase in coma is much greater (e.g., about 4 or more times) than the reduction of spherical aberration. So while the mean spherical aberration is slightly decreased, at the same time the coma is significantly increased, with the net effect being a significant increase in higher-order aberrations in the lens-and-eye combination.

From this testing, it is apparent that designing contact lenses with an amount of spherical aberration equal but opposite to the mean amount of spherical aberration in the mean population eye does not appear to reduce the total aberrations and therefore allow improved visual performance—but in fact, it decreases it—because of the optical-decentration-induced coma and resulting net increase in total high order aberrations. So it was determined that the spherical aberration included in a lens should be targeted at producing a spherical aberration free or neutral effect on the eye. So further research was conducted in an effort to find a new methodology for determining the amount of spherical aberration that should be included in the lens design.

As a starting point, the coma induced by the spherical aberration in lenses was considered. Coma is directly proportional to spherical aberration, with the relationship being as follows: coma is proportional to (spherical aberration)×(optical decentration). Optical decentration is the offset distance between the optical axis of the lens corresponding to the lens optical center and the eye's optical axis (the primary line-of-sight of the eye). In the art of contact lens design, the induction of coma has been largely ignored and underestimated because there is little understanding of the effect of the optical decentration of the contact lens's optical axis from the eye's optical axis.

Figure 3:
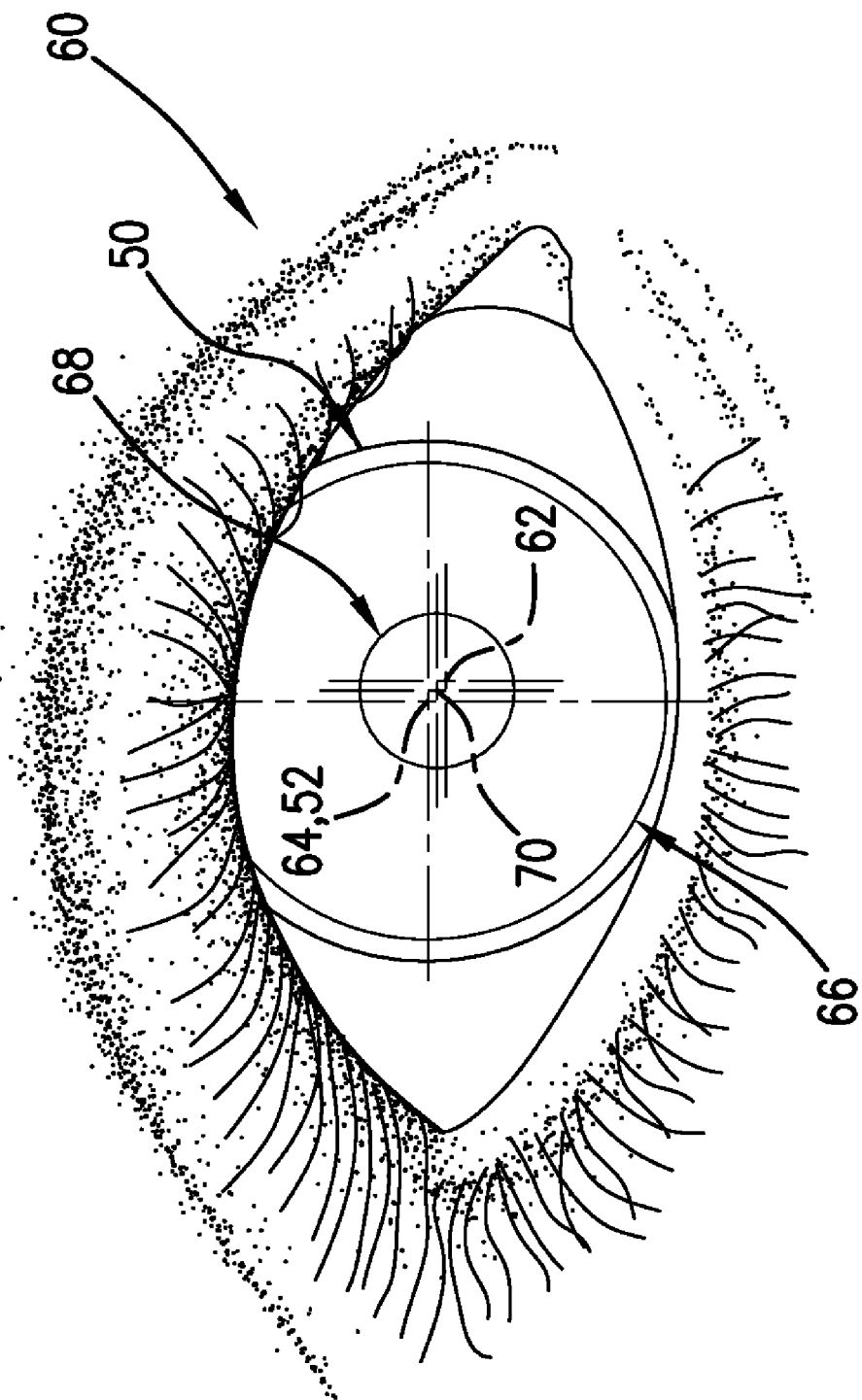
FIG. 3 is a front view of an eye and a contact lens on the eye, showing optical decentration of the lens on the eye.

It has been determined that, generally speaking, contact lenses that are well centered about the visible iris (the colored portion of the eye) are optically decentered with respect to the primary line of sight of the eye. FIG. 3 shows the optical decentration of a contact lens 50 on an eye 60. The eye 60 has an optical center 62 and a physical center 64. And the contact lens 50 has a center 52 (the physical and optical centers of the lens are the same in a rotationally symmetric lens). The physical center 64 of the eye 60 is the geometric center of the visible iris 66, the colored part of the eye that forms a band around the circular pupil 68. As shown in the figure, contact lenses 50 are designed to situate on the eye 60 in a position concentric with the iris 66. So for a "well-centered" lens, the physical center 64 of the eye 60 is substantially the same as the center 52 of the contact lens 50. The eye's optical axis 62 (i.e., the primary line of sight), however, is different from its physical center 64. The primary line of sight 62 of the eye 60 is located nasally and can be slightly downward relative to the physical center 64, as shown in the right eye depicted in the figure. In addition, it should be noted that the physical center 70 of the pupil 68 is different from the optical and physical centers 62 and 64 of the eye 60, and is located between them. As the pupil 68 dilates or constricts, the pupil's physical center 70 (but not the optical center 62 of the eye 60) moves laterally either temporally/outwardly or nasally/inwardly.

Thus, even when the contact lens 50 is perfectly centered on the eye 60 (i.e., perfectly physically centered about the visible iris 66), it is optically decentered. So any spherical aberration that is included in the lens 50 will generate increased levels of coma. And the result of this induced coma is that it has reduced optical and visual quality for the lens wearer.

Based on this reasoning, it was determined that the optical decentration of a contact lens when worn on an eye affects the performance of the lens, i.e., contact lenses perform differently from their calculated design when worn on the eye. In the course of the inventors' further research, it was found that the known prior discussions of lens designs that attempt to account for spherical aberration to improve optical and visual quality address the spherical aberration of lenses as they are designed and when positioned over the visual axis. The assumption seems to have been that contact lenses are static optical elements whose optical characteristics do not change when they are placed and worn on the eye, that any difference between the contact lens optical axis and the eye's visual axis is insignificant, and that any difference caused by the lens flexing on the eye is insignificant. So testing was conducted into how lenses having an inherent spherical aberration that can be theoretically calculated based on the lens design, have different actual measured optical characteristics when they are placed on an eye.

Figure 4:
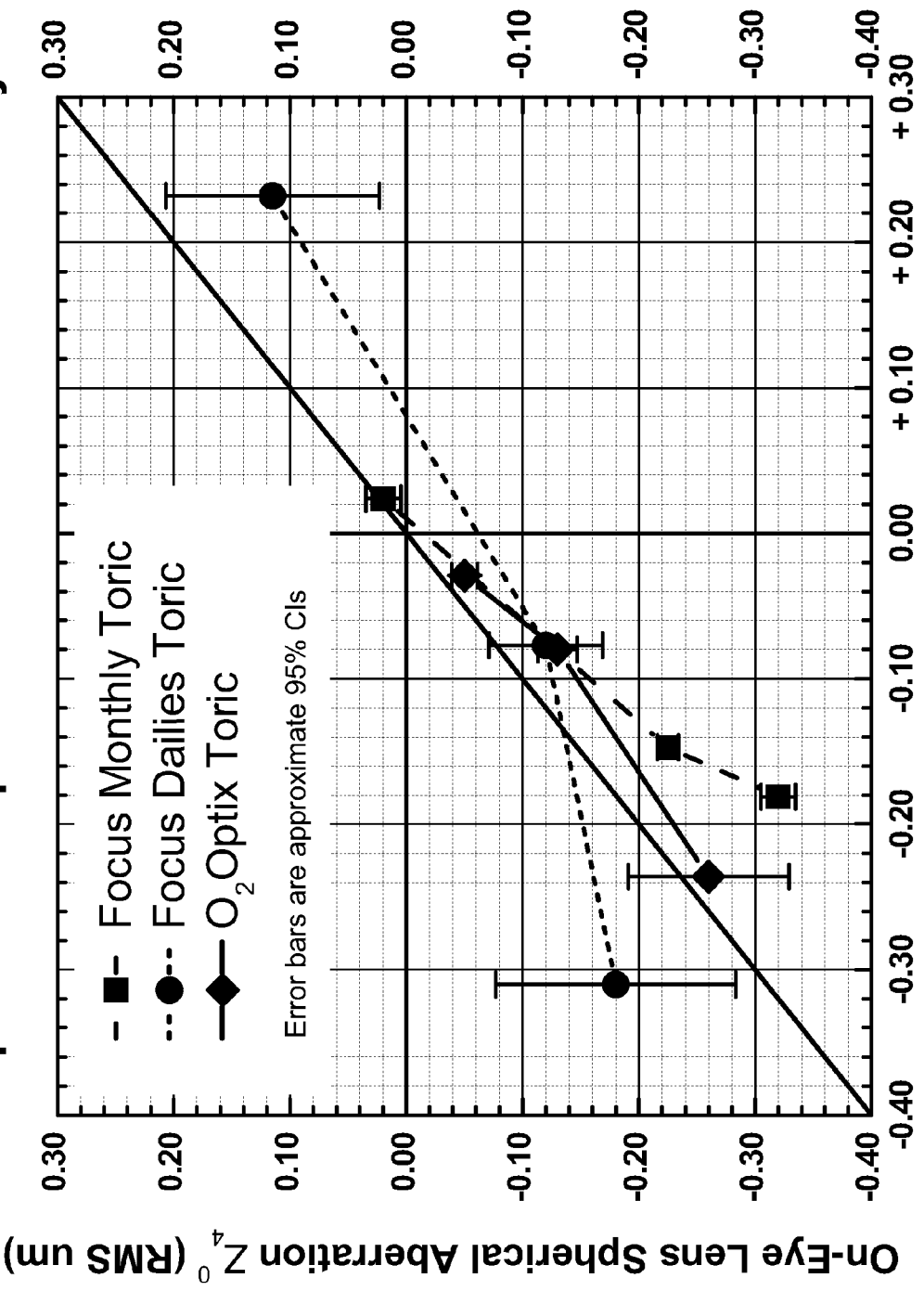
FIG. 4 is a graph of spherical aberration of lenses (measured on-eye) plotted against spherical aberration of lenses (measured off-eye).

FIG. 4 shows a comparison of spherical aberrations measured on-eye versus off-eye for CIBA VISION contact lenses of several different stock powers and of three different designs: FOCUS MONTHLY toric lenses, FOCUS DAILIES toric lenses, and O2 OPTIX toric lenses. Each data-point and 95% confidence interval is for the mean of 10-20 lenses on 10-20 eyes for one of the lens designs in one of the stock powers, and each connected set of data-points is for all of the powers tested for that lens design. The X-axis shows the fourth-order spherical aberrations of the off-eye lenses, that is, the lenses not in situ on the eyes of test subjects. The Y-axis shows the fourth-order spherical aberrations of the on-eye lenses, that is, the lenses in situ on the eyes of test subjects. The on-eye values are the difference between the measured spherical aberration of the eyes and the measured spherical aberration of the lens-and-eye combinations. The units for both axes are microns of wavefront deviation. The X-axis off-eye measurements were taken using a commercially available CLEARWAVE aberrometer (WAVEFRONT SCIENCES, LLC of Albuquerque, N. Mex.). The Y-axis on-eye measurements were taken using a commercially available COMPLETE OPHTHALMIC ANALYSIS SYSTEM (COAS) aberrometer (WAVEFRONT SCIENCES, LLC of Albuquerque, N. Mex.). The measurements were taken with the pupils having greater than a 6 mm diameter and the calculations made for pupils having exactly a 6 mm diameter.

As can be seen from FIG. 4, the measurable spherical aberrations in a contact lens change when the lens is worn on the eye. So when a soft contact lens is worn on the eye there is a change in the spherical aberration of the lens on the eye compared to the lens alone. At least part of the difference can be attributed to lens flexure of the lens when placed on the eye.

This difference is attributable to the lens taking on a different shape when placed on the eye. The measurement of soft contact lens geometry is usually performed with the lens free at rest underwater and lens power often with the lens free in air on a lensometer. This is not the same as when the soft contact lens is worn on the eye. When a lens is inserted in the eye the first action is the lens is distorted to 'fit' the eye by the blinking of the eyelids. When a soft contact lens has been 'blinked' onto the eye, the air is expelled from between the eye and the posterior surface of the lens. The lens now has suction that holds it from falling off the eye. After these first few critical blinks the lens can be said to be worn on the eye; the posterior surface of the lens has now distorted to take a shape close or closer to the shape of the cornea, limbus, and scleral shapes that it now is drawn to by the suction between these two surfaces.

The front surface has also distorted in shape to follow the back surface movement, within the limits of the elasticity of the soft contact lens material. The optical power of the soft contact lens worn on the eye primarily comes from this new anterior surface shape due to the large refractive index change from air to tear film covered anterior surface shape. This anterior surface shape and resulting power of the worn lens comes from the posterior and anterior surface shapes and distortion of the posterior surface to fit the eye. This distortion from the free-in-solution to the worn-lens configuration has been termed 'soft contact lens flexure'.

Furthermore, it was found that another difference in the spherical aberration (which is typically as large as the difference identified in FIG. 4) is attributable to the manufacturing process for the lens itself. The optical performance of contact lenses was found to be slightly different from the expected performance calculated based on the lens design. It was determined that current contact-lens manufacturing processes and systems introduce optical changes into the lenses. Anisometropic expansion and contraction of the lens polymer (or other polymer components) in the lens-manufacturing process are critical sources of surface curvature that effect a difference between the designed and realized spherical aberration in lenses.

This explains how a prior art aspherical contact lens designed with zero spherical aberration can sometimes produce reduced vision. Such a lens might have spherical aberration introduced into it during the manufacturing process, and then when the lens is worn on-eye additional spherical aberration might be generated. This cumulative spherical aberration, by itself, lessens optical and visual quality. And it also induces coma due to the optical decentration, which further and more significantly lessens optical and visual quality. In short, designing a zero spherical aberration lens does not lead to a spherical aberration free lens on the eye and the associated minimizing of higher order aberrations for the lens wearer.

Based on these findings, it was determined that the optimal contact lens design includes an amount of spherical aberration in the lens such that there is no change measured in the on-eye spherical aberration for the lens-and-eye combination. Such a lens design includes spherical aberration adjustments that account for optical performance differences introduced (1) in the lens-manufacturing process; and (2) by lens flexure when the lens is placed on-eye. The spherical aberration adjustment needed for difference (1) is an equal and opposite spherical aberration to that introduced into the lens design by the lens-manufacturing process. The spherical aberration adjustment needed for difference (2) is an equal and opposite spherical aberration to that generated by lens flexure when the lens is placed on the eye. The spherical aberration adjustments for differences (1) and (2) minimize the total higher order aberrations at least in part by minimizing the induction of coma due to optical decentration. Some other embodiments include only spherical aberration adjustments that account for optical performance differences introduced in the lens-manufacturing process. Some other embodiments include only spherical aberration adjustments that account for optical performance differences off-eye to on-eye. And some other embodiments include one or both of these combined with spherical aberration adjustments that account for other optical performance differences.

Testing was conducted to generate optimal aberration profiles of soft contact lenses, as measured on the eye, to minimize total higher order aberrations of soft contact lens-and-eye optical systems. Tables 1-9 include RMS spherical aberration amounts for three designs of CIBA VISION toric contact lenses in several stock powers. The units are microns of wavefront deviation, and the testing is reported for 6 mm diameter pupils. Where the tables show blank fields, the respective lens design was not tested in the respective power. The off-eye measurements were made using a commercially available CLEARWAVE aberrometer (WAVEFRONT SCIENCES, LLC of Albuquerque, N. Mex.). And the on-eye measurements were made using a commercially available COMPLETE OPHTHALMIC ANALYSIS SYSTEM (COAS) aberrometer (WAVEFRONT SCIENCES, LLC of Albuquerque, N. Mex.).

Table 1 shows the amount of calculated spherical aberration inherent in the design of the contact lenses (i.e., the amount of spherical aberration that would be expected to be measured in the off-eye testing). The amount of spherical aberration in the off-eye lenses is calculated using conventional lens design techniques, for example, lens design software such as ZEMAX software. From this Table, it can be seen for example that −3.00 diopter, O2OPTIX toric lenses have theoretically a calculated—0.104 µm of spherical aberration.

TABLE 1

| Lens Sphere | RMS Spherical Aberration (μm) in Lenses Calculated Off-Eye | | |
|---|---|---|---|
| Power (Diopters) | O2Optix Toric | Focus Dailies Toric | Focus Monthly Toric |
| 4.00 |  | 0.107 | 0.107 |
| −1.00 | −0.048 |  |  |
| −3.00 | −0.104 | −0.097 | −0.098 |
| −6.00 | −0.183 |  |  |
| −8.00 |  | −0.224 | −0.228 |

Table 2 shows the amount of spherical aberration actually measured off-eye for the three toric contact lens designs of Table 1. Continuing with the example from Table 1, from Table 2 it can be seen that a −3.00 diopter, O2OPTIX toric lens was measured off-eye to have −0.08 μm of spherical aberration in it.

TABLE 2

| Lens Sphere | RMS Spherical Aberration (μm) in Lenses Measured Off-Eye | | |
|---|---|---|---|
| Power (Diopters) | O2Optix Toric | Focus Dailies Toric | Focus Monthly Toric |
| 4.00 |  | 0.232 | 0.024 |
| −1.00 | −0.029 |  |  |
| −3.00 | −0.08 | −0.077 | −0.147 |
| −6.00 | −0.236 |  |  |
| −8.00 |  | −0.31 | −0.181 |

Table 3 shows the amount of spherical aberration measured on-eye for the three toric contact lens designs of Table 2. These values are the measured on-eye values for the lens-and-eye combinations less the measured values for the eyes alone. Continuing with the example, from Table 3 it can be seen that the −3.00 diopter, O2OPTIX Toric lens from Table 2 was measured on-eye to have −0.13 μm of spherical aberration in it.

TABLE 3

| Lens Sphere | RMS Spherical Aberration (μm) in Lenses Measured On-Eye | | |
|---|---|---|---|
| Power (Diopters) | O2Optix Toric | Focus Dailies Toric | Focus Monthly Toric |
| 4.00 |  | 0.115 | 0.02 |
| −1.00 | −0.05 |  |  |
| −3.00 | −0.13 | −0.12 | −0.225 |
| −6.00 | −0.26 |  |  |
| −8.00 |  | −0.18 | −0.32 |

Table 4 shows the difference in the spherical aberration between that measured off-eye (from Table 2) and that calculated off-eye (from Table 1) for the three toric contact lens designs. These spherical aberration values represent the optical performance changes introduced into the lenses by the manufacturing process. Continuing with the example, for −3.00 diopter, O2OPTIX toric lenses, the Table 4 difference of 0.024 μm spherical aberration is the Table 2 value (−0.080) minus the Table 1 value (−0.104).

TABLE 4

| Lens Sphere | RMS Spherical Aberration (μm) in Lenses Δ Measured Off-Eye − Calculated Off-Eye | | |
|---|---|---|---|
| Power (Diopters) | O2Optix Toric | Focus Dailies Toric | Focus Monthly Toric |
| 4.00 |  | 0.125 | −0.083 |
| −1.00 | 0.019 |  |  |
| −3.00 | 0.024 | 0.02 | −0.049 |
| −6.00 | −0.053 |  |  |
| −8.00 |  | −0.086 | 0.047 |

Table 5 shows the difference in the spherical aberration between that measured on-eye (from Table 3) and that measured off-eye (from Table 2) for the three toric contact lens designs. These spherical aberration values represent the optical performance differences between the lenses off-eye and on-eye. Continuing with the example, for—3.00 diopter, O2OPTIX toric lenses, the Table 5 difference of −0.05 μm spherical aberration is the Table 3 value (−0.13) minus the Table 2 value (−0.080).

TABLE 5

| Lens Sphere | RMS Spherical Aberration (μm) in Lenses Δ Measured On-Eye − Measured Off-Eye | | |
|---|---|---|---|
| Power (Diopters) | O2Optix Toric | Focus Dailies Toric | Focus Monthly Toric |
| 4.00 |  | −0.117 | −0.004 |
| −1.00 | −0.021 |  |  |
| −3.00 | −0.05 | −0.043 | −0.078 |
| −6.00 | −0.024 |  |  |
| −8.00 |  | 0.13 | −0.139 |

Table 6 shows the total spherical aberrations of Tables 4 and 5. That is, Table 6 shows the difference in the spherical aberration between that measured on-eye (from Table 3) and that calculated off-eye (from Table 1) for the three toric contact lens designs. Continuing with the example, for −3.00 diopter, O2OPTIX toric lenses, the Table 6 total difference of −0.026 μm spherical aberration is the Table 4 value (0.024) plus the Table 5 value (−0.05). Note that the results in Table 6 may also be calculated as the Table 3 value minus the Table 1 value.

TABLE 6

| Lens Sphere | RMS Spherical Aberration (μm) in Lenses Δ Total (Measured On-Eye − Calculated Off-Eye) | | |
|---|---|---|---|
| Power (Diopters) | O2Optix Toric | Focus Dailies Toric | Focus Monthly Toric |
| 4.00 |  | 0.008 | −0.087 |
| −1.00 | −0.002 |  |  |
| −3.00 | −0.026 | −0.023 | −0.127 |
| −6.00 | −0.077 |  |  |
| −8.00 |  | 0.044 | −0.092 |

Table 7 shows the amount of spherical aberration to be designed into the three lenses to adjust for the optical performance changes introduced in the manufacturing process. These amounts are equal but opposite to the amounts in Table 4. Continuing with the example, from Table 7 it can be seen that for −3.00 diopter, O2OPTIX toric lenses, the spherical aberration adjustment of −0.024 μm for the manufacturing process is equal but opposite to the amount (0.024 μm) from Table 4.

TABLE 7

| Lens Sphere Power (Diopters) | RMS Spherical Aberration (µm) in Lenses Adjustment for Δ Measured Off-Eye − Calculated Off-Eye | | |
|---|---|---|---|
| | O2Optix Toric | Focus Dailies Toric | Focus Monthly Toric |
| 4.00 | | −0.125 | 0.083 |
| −1.00 | −0.019 | | |
| −3.00 | −0.024 | −0.02 | 0.049 |
| −6.00 | 0.053 | | |
| −8.00 | | 0.086 | −0.047 |

Table 8 shows the amount of spherical aberration to be designed into the three lenses to adjust for the optical performance differences between the lenses off-eye and on-eye. These amounts are equal but opposite to the amounts in Table 5. Continuing with the example, from Table 8 it can be seen that for—3.00 diopter, O2OPTIX toric lenses, the spherical aberration adjustment of 0.05 µm for off-eye to on-eye is equal but opposite to the amount (−0.05 µm) from Table 5.

TABLE 8

| Lens Sphere Power (Diopters) | RMS Spherical Aberration (µm) in Lenses Adjustment for Δ Measured On-Eye − Measured Off-Eye | | |
|---|---|---|---|
| | O2Optix Toric | Focus Dailies Toric | Focus Monthly Toric |
| 4.00 | | 0.117 | 0.004 |
| −1.00 | 0.021 | | |
| −3.00 | 0.05 | 0.043 | 0.078 |
| −6.00 | 0.024 | | |
| −8.00 | | −0.13 | 0.139 |

Table 9 shows the total amount of spherical aberration to be designed into the three resulting optimized lenses to adjust for the optical performance changes introduced in the manufacturing process and the optical performance differences between the lenses off-eye and on-eye. These amounts are the totals of the amounts in Tables 7 and 8, thus, these amounts are equal and opposite to the amounts in Table 6. Continuing with the example, for—3.00 diopter, O2OPTIX toric lenses, the Table 9 total spherical aberration adjustment of 0.026 µm is the Table 7 manufacturing process adjustment (−0.024) plus the Table 8 off-eye to on-eye adjustment (0.05).

TABLE 9

| Lens Sphere Power (Diopters) | RMS Spherical Aberration (µm) in Lenses Adjustment for Δ Total (Measured On-Eye − Calculated Off-Eye) | | |
|---|---|---|---|
| | O2Optix Toric | Focus Dailies Toric | Focus Monthly Toric |
| 4.00 | | −0.008 | 0.087 |
| −1.00 | 0.002 | | |
| −3.00 | 0.026 | 0.023 | 0.127 |
| −6.00 | 0.077 | | |
| −8.00 | | −0.044 | 0.092 |

Based on Table 9, it can be seen that the amount of the spherical aberration adjustment for the lenses tested ranges from greater than about −0.044 µm to less than about +0.127 µm. While Table 9 demonstrates the spherical aberration adjustments for lenses with powers from +4.00 to −8.00, or a full range of dioptric powers as are normally manufactured for mass-produced lenses, e.g., −15.00 Diopter or less to +10.00 Diopter or greater, such a range of spherical aberration adjustment will generally be from greater than about −0.06 µm to less than about +0.18 µm.

Figure 5:
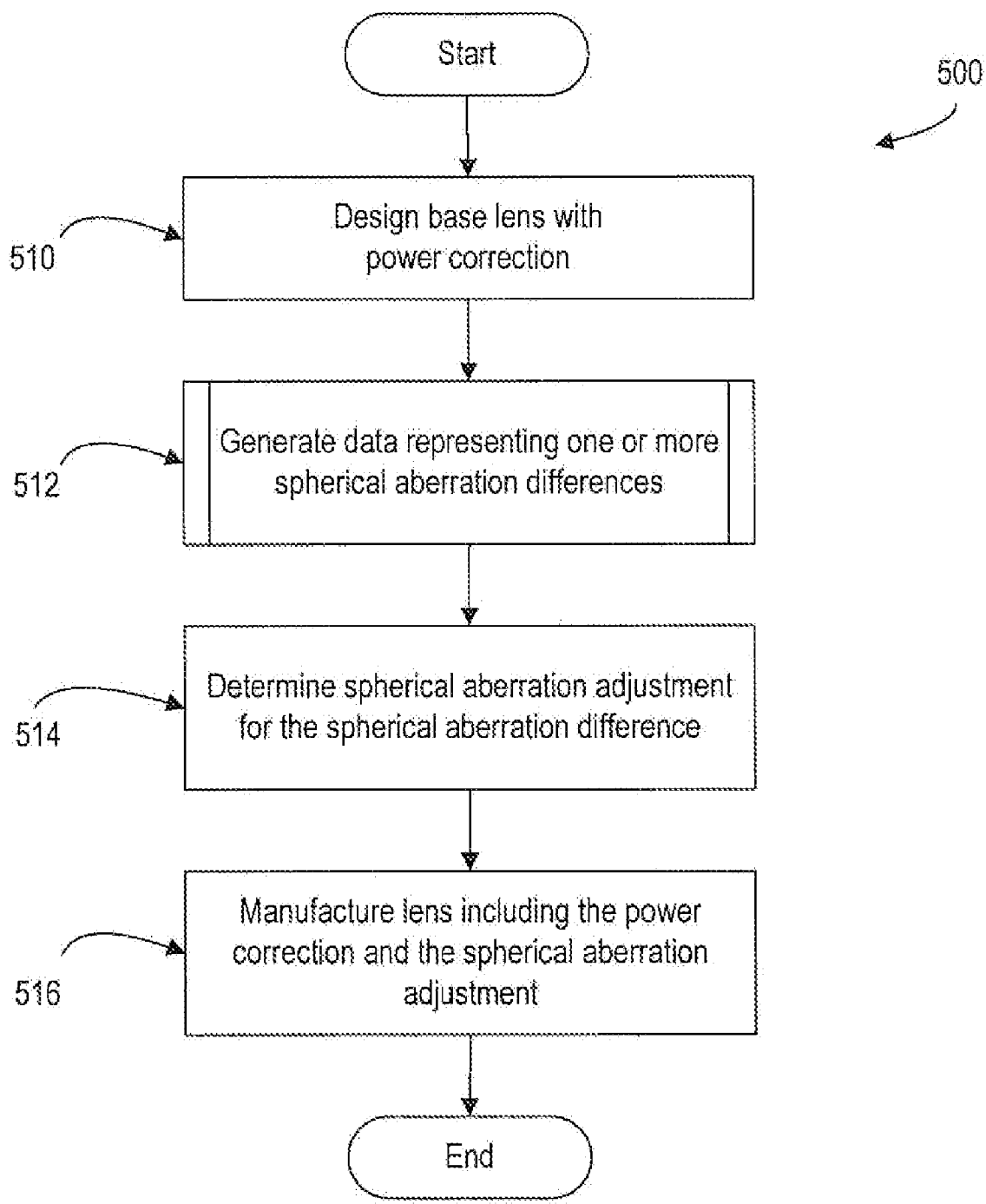
FIG. 5 is a flow diagram depicting a method of designing and manufacturing the ophthalmic lens with optimal optical aberrations of FIG. 1.

Referring now to FIG. 5, a method 500 of designing and manufacturing lenses with optimal optical aberrations will now be described. At step 510 the method includes designing a base lens. The base lens design typically includes a power correction for correcting refractive errors in the eye. Thus, the base lens design may be, for example, for any of the contact lens designs mentioned above, including the O2OPTIX, FOCUS DAILIES, or FOCUS MONTHLY toric lenses. Alternatively, the base lens design may be for another contact lens design (e.g., a spherical lens) or for a different type of ophthalmic lens (e.g., an intraocular lens).

At step 512 the method includes generating data representing at least one spherical aberration difference from the base lens design. The spherical aberration difference may be that introduced (1) in the lens-manufacturing process; (2) off-eye to on-eye; (3) both in the lens-manufacturing process and off-eye to on-eye; or (4) by one or both of these in combination with other causes of spherical aberration introduction. This step includes making or having made a lens according to the design of step 510, and measuring the lens to generate the data.

The data generation step 512 may be carried out in different ways included within the scope of the invention. As an example, for a spherical aberration difference introduced in the lens-manufacturing process, this step may include calculating the spherical aberration in the base lens design off-eye (e.g., as discussed above with respect to Table 1), measuring the off-eye spherical aberration in a base lens manufactured according to the base lens design (e.g., as discussed above with respect to Table 2), and calculating the difference between the spherical aberrations measured in the lens off-eye and calculated in the lens design off-eye (e.g., as discussed above with respect to Table 4). The base lens is manufactured according to the base lens design using conventional lens fabrication machinery and techniques known in the art. This lens-manufacturing step may be performed separately by other than the designer or as an integral step in the method 500.

As another example, for a spherical aberration difference introduced off-eye to on-eye (i.e., by lens flexure upon placing the lens on the eye), the data generation step 512 may include measuring the spherical aberration in the base lens off-eye (e.g., as discussed above with respect to Table 2), measuring the spherical aberration in the base lens on-eye (e.g., as discussed above with respect to Table 3), and calculating the difference between the lens spherical aberrations measured on-eye and measured off-eye (e.g., as discussed above with respect to Table 5). And as yet another example, for spherical aberration differences introduced both in the lens-manufacturing process and off-eye to on-eye, this step may include calculating the spherical aberration in the base lens design off-eye (e.g., as discussed above with respect to Table 1), measuring the spherical aberration in the base lens on-eye (e.g., as discussed above with respect to Table 3), and calculating the difference between the spherical aberrations measured on-eye and calculated off-eye (e.g., as discussed above with respect to Table 6).

Next, at step 514 the method includes determining a spherical aberration adjustment based on the spherical aberration difference. The spherical aberration adjustment is selected to substantially offset the spherical aberration difference. So the adjustment value is substantially equal but opposite to the difference value. Typically, the spherical aberration adjustment is selected to exactly offset the spherical aberration difference, so the adjustment value is exactly equal but opposite to the difference value. Alternatively, the spherical aberration adjustment may be otherwise based on and correlated to the spherical aberration difference such that the optical performance of the resulting optimized lens is significantly improved when worn on the eye. The result of including this spherical aberration adjustment is that there is substantially no change in the on-eye spherical aberration (as measured using conventional measurement devices) in the lens-and-eye combination. Any difference between the adjustment value and the difference value is kept as small as possible within the practical limits of conventional lens-manufacturing systems (0.5 µm RMS) and is preferably within about 0.1 µm RMS.

And at step 516 the method includes designing and manufacturing an optimized lens that includes the spherical aberration adjustment (and typically also includes an optical power correction). Typically, a very large number of the optimized lenses are made in each of a number of pre-determined discrete stock powers. The optimized lenses may be manufactured using conventional lens fabrication machinery and techniques known in the art. This lens-manufacturing step may be performed separately by other than the designer or as an integral step in the method 500. The resulting lens has an optimal design that includes an amount of spherical aberration in the lens such that there is substantially no measured change in the on-eye spherical aberration for the lens-and-eye combination.

It should be noted that, for a spherical aberration difference introduced in the lens-manufacturing process, the manufacturing equipment used to make the optimized lens (with the spherical aberration adjustment) in step 516 and the base lens (whose spherical aberration is measured in step 512) is of the same type. Once the base lenses have been evaluated on-eye, an adjustment equal and opposite to the remaining on-eye spherical aberration can be used cycling back to step 514.

In addition, the invention provides other variations in the lens design and manufacturing method 500 of FIG. 5. For example, the lens design steps can be performed by a lens designer who is separate and distinct from the lens manufacturer who performs the lens manufacturing steps.

The embodiments described above are toric contact lenses. The same methodology for optimal aberration profiles is believed to apply to other types of ophthalmic lenses having the optical center in the geometric center of the lens. This includes all current spherical, aspherical, and bifocal/multifocal lenses, for example soft contact lenses. For bifocal/multifocal soft contact lenses, the zone with the largest amount of RMS spherical aberration is preferably located closest to the optical center of the lens to minimize the induced coma.

While the invention has been described with reference to preferred and example embodiments, it will be understood by those skilled in the art that a variety of modifications, additions and deletions are within the scope of the invention, as defined by the following claims.

What is claimed is:

1. A method of designing an optimized ophthalmic lens for wearing on an eye, comprising:
   designing a base lens;
   generating data representing a spherical aberration difference introduced when a base lens is placed on and measured on the eye, the data-generating step including measuring offeye spherical aberration in the base lens; measuring on-eye spherical aberration in the base lens; and calculating the difference between the base lens spherical aberrations measured on-eye and measured off-eye;
   determining a spherical aberration adjustment based on the spherical aberration difference; and
   designing the optimized lens to include the spherical aberration adjustment.

2. The method of claim 1, wherein the adjustment-determining step includes selecting the spherical aberration adjustment to be substantially equal and opposite to the spherical aberration difference.

3. The method of claim 1, wherein the adjustment-determining step includes selecting a spherical aberration adjustment so that when the optimized lens is well-centered on the eye the on-eye lens-and-eye combination is substantially free of spherical aberration.

4. The method of claim 3, wherein the adjustment-determining step includes selecting the spherical aberration adjustment to be greater than about −0.06 µm RMS and less than about +0.18 µm for an about 6 mm pupil.

5. The method of claim 4, wherein the spherical aberration adjustment is greater than about −0.044 µm and less than about +0.127 µm for an about 6 mm pupil.

6. The optimized ophthalmic lens manufactured according to the ophthalmic lens design of claim 1.

7. A method of designing and manufacturing an optimized ophthalmic lens for wearing on an eye, comprising:
   designing a base lens;
   manufacturing a base lens according to the base lens design using base lens manufacturing equipment;
   generating data representing spherical aberration differences in the manufactured base lens from the base lens design, wherein the differences include that introduced by the base lens manufacturing equipment into the base lens and that introduced by lens flexure when the base lens is placed on the eye, the data-generating step including calculating offeye spherical aberration in the base lens design; measuring on-eye spherical aberration in the base lens; and calculating the difference between the spherical aberrations measured in the base lens on-eye and calculated in the base lens design off-eye;
   selecting a spherical aberration adjustment to be substantially equal and opposite to the spherical aberration difference, wherein the aberration adjustment is selected so that the on-eye lens-and-eye combination is substantially free of spherical aberration when the optimized lens is well-centered on the eye;
   designing the optimized lens to include the spherical aberration adjustment; and
   manufacturing the optimized lens according to the optimized lens design using optimized lens manufacturing equipment that is of the same type as the base lens manufacturing equipment.

8. The method of claim 7, wherein the adjustment-determining step includes selecting the spherical aberration adjustment to be is greater than about −0.06 µm and less than about +0.18 µm for an about 6 mm pupil.

9. The method of claim 8, wherein the spherical aberration adjustment is greater than about −0.044 µm and less than about +0.127 µm for an about 6 mm pupil.

10. The optimized lens manufactured according to the optimized lens design of claim 7.

11. An optimized ophthalmic lens for wearing on an eye, comprising:
   a refractive surface with a spherical aberration adjustment, wherein the spherical aberration adjustment is selected so that the on-eye lens-and-eye combination is substantially free of spherical aberration when the optimized lens is well-centered on the eye; and
   wherein the spherical aberration adjustment is based on a spherical aberration difference from a base lens design, wherein the difference includes that introduced by base lens manufacturing equipment into a base lens made according to the base lens design and that introduced by lens flexure when the base lens is placed on the eye.

12. The ophthalmic lens of claim 11, wherein the spherical aberration adjustment is substantially equal and opposite to a spherical aberration difference.

13. The ophthalmic lens of claim 11, wherein the spherical aberration difference includes the difference between spherical aberration measured in the base lens on-eye and spherical aberration calculated in the base lens design off-eye.

14. The ophthalmic lens of claim 11, wherein the optimized lens is made using optimized lens manufacturing equipment that is of the same type as the base lens manufacturing equipment.

15. The ophthalmic lens of claim 11, wherein the spherical aberration adjustment is greater than about −0.06 μm and less than about +0.18 μm for an about 6 mm pupil.

16. The ophthalmic lens of claim 15, wherein the spherical aberration adjustment is greater than about −0.044 μm and less than about +0.127 μm for an about 6 mm pupil.

* * * * *